June 23, 1942.　　P. B. WOLVERTON ET AL　　2,287,491
AIRCRAFT LANDING GEAR
Filed Sept. 19, 1940　　2 Sheets-Sheet 1
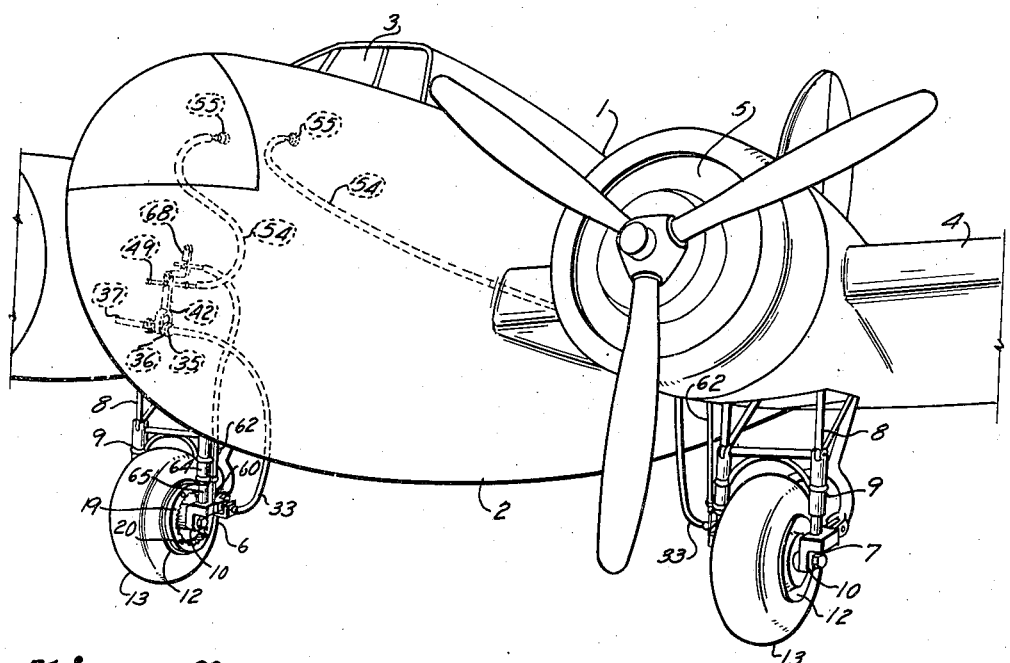
INVENTORS
Percy B. Wolverton, and
Chester R. Hughes
BY
Arthur C. Brown
ATTORNEY June 23, 1942.                P. B. WOLVERTON ET AL                2,287,491
                                AIRCRAFT LANDING GEAR
                                Filed Sept. 19, 1940                2 Sheets-Sheet 2

INVENTORS
Percy B. Wolverton, and
Chester R. Hughes
BY
Arthur C. Brown
ATTORNEY

Patented June 23, 1942

2,287,491

UNITED STATES PATENT OFFICE 2,287,491

AIRCRAFT LANDING GEAR

Percy B. Wolverton and Chester R. Hughes, Kansas City, Mo.

Application September 19, 1940, Serial No. 357,376

14 Claims. (Cl. 244—103)

This invention relates to aircraft landing gear and more particularly to a device for rotating the wheels of aircraft preparatory to landing the aircraft; the principal objects of the present invention being to provide a convenient, relatively economical and highly efficient device of the character noted.

It has been found in actual practice that the tires of aircraft have an extremely short life, especially on large, heavy craft, which shortness of life is due largely to the fact that when normal landings are made, the aircraft wheels are not rotating in any near proportion to the ground speed of the craft. This speed difference causes extreme wear and strain on the tires at the first impact thereof with the ground or runway and a scuffing of the wheels results, which continues until the rotational speed of the tires equals the ground speed of the craft. The impact, scuffing and speed differences often cause tire blowouts and in some cases, damage to the aircraft due to nosing over of the craft.

Other objects of the present invention are, therefore, to provide for causing the landing wheels of aircraft to rotate at approximate ground speeds of the craft while the craft is still in the air and preparatory to making a landing and contacting the ground; to make possible a smoother landing, and thus relieve much of the strain on the landing gear as well as wear on the tires; to increase the safety in landing; work substantial economies due to savings in the longer life of aircraft tires and related equipment; to provide for discontinuance of power application in rotating aircraft wheels when the ground speed of the craft exceeds the rotational speed of the wheels; to provide for positively effecting application of power to the wheels in such a manner that the operator of the aircraft may be fully conscious of such application of power and consequent rotation of the wheels; to provide against accidental actuation of the wheel rotating device; to assure that the device generally may be protected; to provide a substantially foolproof landing gear of this character; and to provide improved elements and arrangements thereof in a landing gear of the character and for the purposes noted.

In accomplishing these and other objects of the present invention, we have provided improved details of structure, the preferred form of which is illustrated in the accompanying drawings, wherein:

Fig. 1 is a fragmentary perspective view of a conventional aircraft showing my improved landing gear applied thereto, parts thereof being shown diagrammatically in dotted lines.

Fig. 2 is a plan view of the landing gear for one of the wheels of the aircraft illustrated in Fig. 1, parts of the wheel being broken away to illustrate the manner of applying power to rotate the wheel.

Fig. 3 is a plan view somewhat similar to Fig. 2 illustrating the manner in which application of power to rotate the wheel is discontinued.

Figure 4:
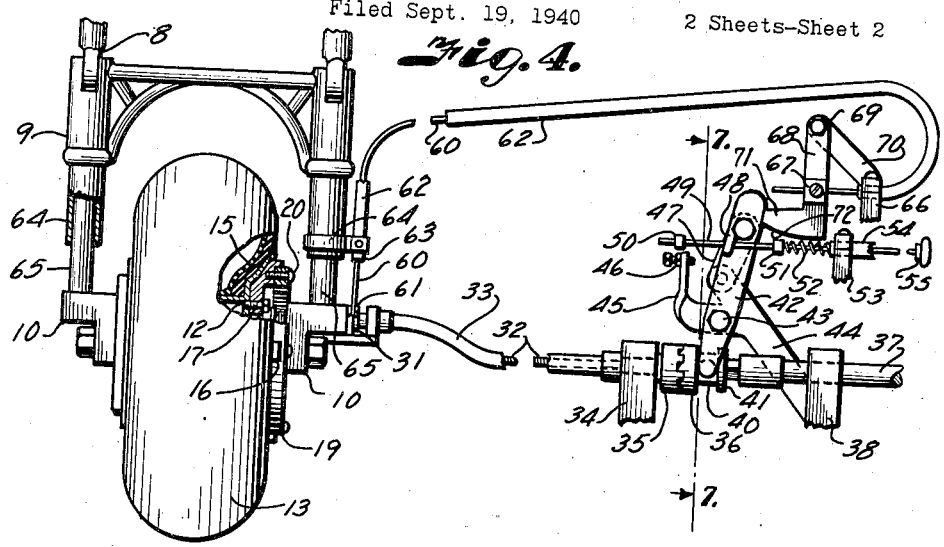
Fig. 4 is an elevational view of the landing gear for a wheel of an aircraft showing the application of the wheel rotating device thereto and the relation of the elements of the wheel rotating device, the same being shown in operative power applying condition.

Referring more in detail to the drawings:

1 designates a conventional aircraft which preferably includes a fuselage 2 having an operator's compartment 3, wings 4, a source or sources of power 5, and landing gear 6 and 7. The landing gear 6 and 7 are preferably of retractible type and each unit thereof is preferably substantially a duplicate of the other. Each landing gear unit, as an example, also preferably involves standards 8 that are suitably connected to the aircraft, a suitable shock absorber 9 preferably being suitably connected with the standards 8, and bearing bosses 10 preferably being connected in a suitable manner to the shock absorbers. An axle 11 may be suitably mounted at its opposite ends in aligned bearing openings of the blocks 10 and a wheel structure 12 is suitably mounted on the axle, the wheel structure being provided with a tire 13 that is preferably of pneumatic type.

As an illustration of a suitable manner in which the present invention may be carried out, 15 designates a portion of a rim member for the wheel structure 12 upon which lugs 16 are secured as by fastening devices 17. The lugs 16 are preferably arranged on the inner face of each wheel structure relative to each other and shoulders 18 are provided on each lug for seating a ring gear 19 which may be secured to the lugs 16 as by fastening devices 20.

The bearing block 10 on the inner portion of each landing gear unit is preferably provided with a transverse bore 21 for rotatably mounting a shaft 22. The end of the shaft 22 adjacent the ring gear is preferably threaded as at 23 and is provided with a pinion 24 that is adapted to mesh on its outer periphery with the teeth of the ring gear 19. The pinion 24 is also threaded on its inner periphery in corresponding relation to the threads 23 of the shaft 22 and is adjusted to a relatively loose or free fit in such a manner that it will travel easily back and forth on the shaft. The pinion 24 is also preferably provided with a stop pin 25 that is engageable with stop members 26 and 27 on an abutment 28 arranged at the extreme inner end of the shaft 22 for limiting movement of the pinion in the direction of the wheel. The shaft 22 is provided at its outer end with a stop 30 to limit movement thereof away from the wheel and a coupling 31 connects the shaft 22 with a preferably flexible shaft 32 that may be encased in a sheath 33. The flexible shaft 32 extends to a suitable bearing post 34 that is mounted in a suitable manner and position on the aircraft, the flexible shaft being provided at its end opposite the bearing block 10 and adjacent the bearing post 34 with a clutch element 35 that is cooperable with a clutch element 36 at one end of a shaft 37.

The shaft 37 is mounted in a suitable bearing post 38 adjacent the bearing post 34. The shaft 37 provides the driving force for the device embodying the present invention and may be rotated in a suitable manner by any available source of power in the aircraft capable of imparting rotative motion to the shaft.

In order to control actuation or rotation of the flexible shaft 32, the clutch element 36 is provided with a sleeve 40 that is slidable on the shaft 37 together with a collar 41 with which a lever 42 is loosely connected in a known manner. The lever 42 is preferably fulcrumed, as at 43, on a bracket 44 that is preferably supported by the post 38, a stop arm 45 being extended from the bracket 44 into the normal path of movement of the lever 42 and having an adjusting device 46 to accurately control the amount of movement permitted the lever. A link 47 preferably interconnects the upper end of the lever 42 with a supporting boss on the bracket 44.

The upper end of the lever 42 is provided with a boss 48 having an aperture therethrough for passing a control rod 49. The control rod 49 is provided with stops 50 and 51 on opposite sides of the boss 48, which stops are spaced in accordance with the amount of swinging movement to which it is desired to limit the lever 42. A spring 52 is also preferably mounted on the rod 49 and bears at one end against the stop 51 and at its other end against a bearing post 53 that is suitably arranged on the aircraft. The rod 49 is further preferably encased in a sheath 54 and extends into the aircraft operator's compartment at a convenient position therein, the rod terminating in a knob or handle 55 to facilitate manipulation thereof by the operator.

With the construction thus far described, and assuming the clutch elements to be enmeshed and with the shaft 37 in rotative operation, the pinion 24 rides out on the shaft 22, until limited by engagement of the stop pin with the stops 26 or 27, into engagement with the ring gear to rotate the aircraft wheel or wheels. When the wheels contact the ground, they sometimes exceed the rotational speed of the pinion 24 and the pinion thereupon rides back on the shaft 22 out of engagement with the ring gear, thus protecting the device and obviating strains on the shaft 37 and related parts of the aircraft that would normally be encountered.

Once the aircraft is on the ground, its own power sources rotate the wheels and there is no necessity for rotating the wheels through the device embodying this invention. Disconnecting means are, therefore, provided to discontinue application of power from the shaft 37 relative to the wheels, which means preferably include a control rod 60 for each wheel that is engaged, as by a fastening device 61, with a bearing block 10 of the aircraft landing gear. The rod 60 is encased in a sheath 62, one end 63 of which is engaged with the stationary element 64 of the shock absorber in such a manner that upon landing of the aircraft the movable element 65 of the shock absorber moves upwardly relative to the stationary element 64 and carries with it the rod 60. Movement is, therefore, imparted to the rod 60 upon landing of the aircraft, which movement is transmitted to the rod throughout its length.

Figure 5:
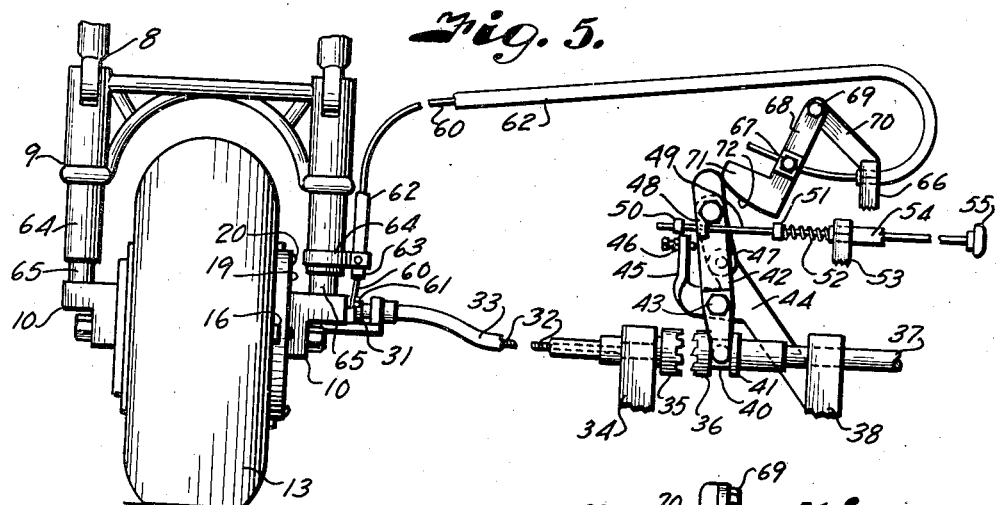
Fig. 5 is a view somewhat similar to Fig. 4 showing the wheel rotating device in a position in which power is not applied to an aircraft landing wheel.
Figures 6, 7:
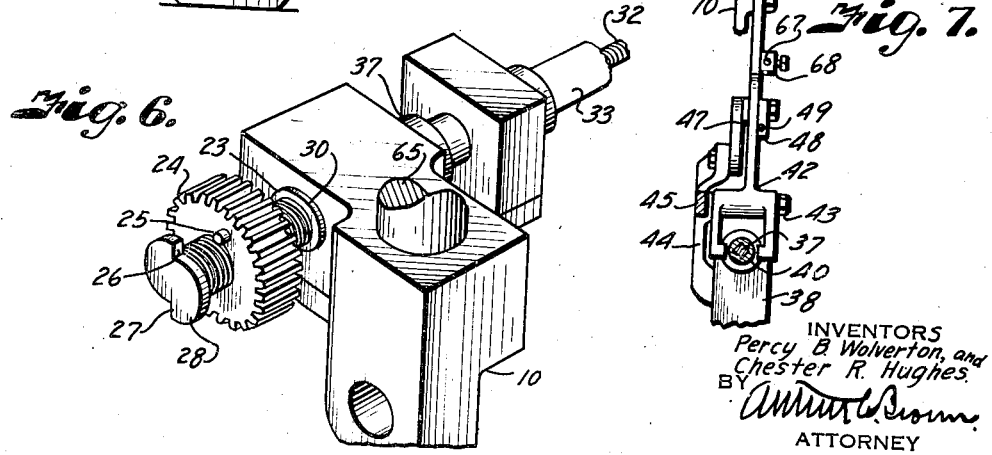
Fig. 6 is a detail perspective view of a portion of the landing gear particularly illustrating the driving element for rotating the aircraft wheel.
Fig. 7 is an end elevational view of the lever arrangement for rendering the device embodying my invention operative and inoperative relative to an aircraft wheel, Fig. 7 being taken substantially on the line 7—7, Fig. 4.

The end of the rod opposite the bearing block 10 is slidably mounted in a suitable channel of a bearing post 66 that is suitably mounted on the aircraft, the extreme outer end of the rod 60 being engaged, as at 67, with a lever 68 that is pivoted, as at 69, to a bracket 70 supported by the bearing post 66. The lever 68 has a foot member 71 that is engageable at its forward preferably arcuately curved lower end 72, upon movement of the rod 60 in one direction, with the upper preferably rounded end of the lever 42 in such a manner as to fulcrum the lever 42 and, as shown in Fig. 5, separate the clutch elements 35 and 36 to de-energize or discontinue application of power of the shaft 37 relative to the shaft 32, it being apparent that, with the clutch members separated as shown in Fig. 5 and when the wheels 13 are on the ground and the shock absorbers are compressed, reengagement of the driving clutches is precluded by engagement of the rounded surfaces of the lever 42 and foot member 71. It is thus apparent that neither a positive conscious pull on the knob 55 nor minor vertical oscillations of the shock absorbers due, for example, to taxiing will effect reengagement of the clutches. Possible damage to the wheel rotating device is thus obviated.

The operation of landing gear constructed as described is as follows:

Assuming an aircraft to be in the air and about to land, the operator of the aircraft manipulates the handle 55 in his compartment to fulcrum the lever 42 and effect mesh of the clutch elements 35 and 36. Rotation of the shaft 37 is transferred to the pinion 24 to rotate the aircraft wheel to which it is connected at a speed determinable by the aircraft operator by control of the power source. As the aircraft wheels touch the ground, the wheels rotate through friction with the ground and if the ground speed of the wheels exceeds the rotational speed of the pinion, the pinion rides back on the shaft 22 out of driving engagement with the gear wheel on the aircraft wheel.

Simultaneously with contact of the aircraft wheels with the ground, the shock absorber elements are relatively compressed or retracted and the rod 60 is moved upwardly and inwardly relative to its sheath in such a manner as to pivot the lever 68 and effect engagement of the foot 71 with the upper end of the lever 42. Such engagement fulcrums the lever 42 to separate the clutch elements 35 and 36, thus rendering the wheel rotating device ineffective. Fulcruming of the lever 42 to separated relation also draws the rod 49 to retracted position in the operator's compartment to render it available for further manipulation when the device is to be operated again.

It is apparent, therefore, that the present invention provides a convenient, economical and efficient adjunct to present aircraft landing gear in which power from normal sources employed by aircraft may be utilized as a source of power for rotating the wheels; which requires an operator to be conscious of operating the device when it is desired to use the same; and which is automatically rendered ineffective upon landing of the aircraft, either through excessive speeds of the ground wheels relative to rotational speeds of the wheel rotating elements or actuation through shock absorbing devices on the aircraft to render the device ineffective, thus providing a substantially fool-proof arrangement coupled with safety factors that are important to aircraft maintenance.

What we claim and desire to secure by Letters Patent is:

1. In combination with an aircraft having landing wheels, a shock absorber and a source of power, means connected with the source of power engageable with said landing wheels for rotating the same, means for effecting disengagement of said wheel rotating means from the wheels, and a control for said disengaging means engaged with and actuated by said shock absorber.

2. In combination with an aircraft having landing wheels, and a source of power, a yieldable member supporting the aircraft on said wheels, means connected with the source of power engageable with said landing wheels for rotating the same, means for effecting engagement of said wheel rotating means with the wheels, a control for said engaging means arranged adjacent the operator's position in the aircraft, and means actuated in response to yielding of the yieldable member under weight of the aircraft for disengaging the wheel rotating means from the wheels.

3. In combination with an aircraft having wheels, separable driving means engageable with said wheels for rotating the same, a clutch for interconnecting portions of said driving means, means engaged with said clutch for actuating the same, means arranged adjacent the operator's position in the aircraft for operating said clutch actuating means, and means responsive to weight of said aircraft for actuating said clutch actuating means.

4. In combination with an aircraft having a source of power, landing wheels and shock absorbers for said landing wheels, means engaged with said source of power and engageable with said wheels for rotating the same, and means engaged with said shock absorbers and engageable with said wheel rotating means for effecting disengagement of said wheel rotating means relative to said wheels upon actuation of said shock absorbers responsive to contact of said wheels with the ground.

5. In combination with an aircraft having rotatable landing wheels and ring gears mounted on said wheels respectively, rotatable separable shafts each having an overruning pinion engageable with one of said ring gears, clutches for interconnecting the separable portions of said shafts, levers for actuating said shaft clutches, and means engaged with said levers, said means having portions arranged adjacent the operator's position in the aircraft for operating said levers.

6. In combination with an aircraft having rotatable landing wheels and a shock absorber for said wheels, ring gears mounted on said wheels respectively, rotatable separable shafts each having an overruning pinion engageable with one of said ring gears, clutches for interconnecting the separable portions of said shafts, levers for actuating said shaft clutches, means engaged with said levers, said means having portions arranged adjacent the operator's position in the aircraft for operating said levers, shafts engaged with said shock absorbers, and levers on said last-named shafts engageable with said first-named levers respectively upon actuation of said second named shafts responsive to movement of the shock absorbers for disconnecting said first named shaft portions upon contact of the aircraft wheels with the ground.

7. In combination with an aircraft having at least one rotatable landing wheel and a shock absorber for said wheel, a ring gear mounted on said wheel, a rotatable shaft having a pinion removably engageable with said ring gear depending upon speed differences between said wheel and shaft, a clutch for interconnecting separable portions of said shaft, a lever for actuating said clutch, and control means for said clutch actuating lever engaged with and operated by said shock absorber.

8. In combination with an aircraft having at least one rotatable landing wheel and a shock absorber for said wheel, a ring gear mounted on said wheel, a rotatable shaft having a pinion removably engageable with said ring gear depending upon speed differences between said wheel and shaft, a clutch for interconnecting separable portions of said shaft, a lever for actuating said clutch, and means engaged with said lever having a portion arranged adjacent the operator's position in the aircraft for operating said lever.

9. In combination with an aircraft having at least one rotatable landing wheel and a shock absorber for said wheel, a ring gear mounted on said wheel, a rotatable shaft having a pinion removably engageable with said ring gear depending upon speed differences between said wheel and shaft, a clutch for interconnecting separable portions of said shaft, a lever for actuating said clutch, means engaged with said lever having a portion arranged adjacent the operator's position in the aircraft for operating said lever, a shaft engaged with said shock absorber, and a lever on said last-named shaft engageable with said first-named lever upon actuation of said second named shaft responsive to movement of the shock absorber for disconnecting said separable shaft portions upon contact of the aircraft wheels with the ground.

10. In combination with an aircraft having a landing wheel, a yieldable member supporting a portion of the weight of the aircraft on said wheel, driving means, control means for effecting engagement of said driving means with the wheels for rotating same, and means on the aircraft having connection with the wheel whereby yielding of the yieldable member in response to weight of the aircraft thereon effects actuation of the control means for disengaging the driving means from the wheel.

11. In combination with an aircraft having wheels, driving means engageable with said wheels for rotating the same, a clutch for interconnecting portions of said driving means, toggle levers engaged with said clutch for actuating the same, means arranged adjacent the operator's position in the aircraft for operating said clutch toggle levers, means responsive to weight of said aircraft for actuating said clutch toggle levers to disengage the portions of the driving means, said toggle levers holding the clutch in disengaged position until the operating means adjacent the operator's position is operated to actuate the toggle levers and re-engage the clutch.

12. In combination with an aircraft having a landing wheel, a yieldable member supporting a portion of the aircraft weight on said wheel, driving means for rotating said wheel, clutch means for effecting driving engagement of said driving means with said wheel for rotating same, actuating means on the aircraft having connection with the wheel for effecting disengagement of the clutch in response to application of the weight of the aircraft to the wheel, and means operated by the actuating means for engaging said clutch means for holding the clutch means in disengaged position when the weight of the aircraft is supported by the yieldable member.

13. In combination with an aircraft having landing wheels and a source of power, a yieldable member supporting a portion of the aircraft weight on said wheel, means connected with the source of power engageable with said landing wheels for rotating same, means for effecting disengagement of the wheel rotating means from the wheels, a control for said disengaging means engaged with said landing wheels and actuated by application of the weight of the aircraft on the yieldable member, and means for holding said disengaging means in position to prevent re-engagement of the wheel rotating means with the wheels while the weight of the aircraft is on said wheels.

14. In combination with an aircraft having a rotatable landing wheel, a ring gear mounted on said wheel, a rotatable shaft having a pinion removably engaged with said ring gear depending upon speed difference between said wheel and shaft, a clutch for interconnecting separate portions of said shaft, actuating means including toggle levers for operating said clutch, manual means engaging said toggle levers for actuating said clutch, and means responsive to the weight of the aircraft on the wheels thereof having engagement with the toggle levers for actuating same to effect disengagement of the clutch, said toggle levers maintaining the clutch in disengaged position until same is re-engaged by actuation of the manual means.

PERCY B. WOLVERTON.
CHESTER R. HUGHES.